United States Patent
Jarosz et al.

(10) Patent No.: US 9,665,974 B2
(45) Date of Patent: May 30, 2017

(54) METHODS AND SYSTEMS OF JOINT PATH IMPORTANCE SAMPLING

(71) Applicant: Disney Enterprises, Inc., Burbank, CA (US)

(72) Inventors: Wojciech Jarosz, Zurich (CH); Iliyan Georgiev, London (GB); Jaroslav Krivanek, Prague (CZ); Toshiya Hachisuka, Aarhus (DK); Derek Nowrouzezahrai, Montreal (CA)

(73) Assignee: DISNEY ENTERPRISES, INC., Burbank, CA (US)

( * ) Notice: Subject to any disclaimer, the term of this patent is extended or adjusted under 35 U.S.C. 154(b) by 426 days.

(21) Appl. No.: 14/282,486

(22) Filed: May 20, 2014

(65) Prior Publication Data
US 2015/0035831 A1    Feb. 5, 2015

Related U.S. Application Data

(60) Provisional application No. 61/861,636, filed on Aug. 2, 2013.

(51) Int. Cl.
*G06T 15/00* (2011.01)
*G06T 15/50* (2011.01)

(52) U.S. Cl.
CPC .................. *G06T 15/506* (2013.01)

(58) Field of Classification Search
CPC ........................................ G06T 15/506
USPC ........................................ 345/426
See application file for complete search history.

(56) References Cited

U.S. PATENT DOCUMENTS

| | | | | |
|---|---|---|---|---|
| 8,576,227 | B1 * | 11/2013 | Pantaleoni | G06T 15/50 345/419 |
| 8,638,331 | B1 * | 1/2014 | Jarosz | G06T 15/06 345/426 |
| 9,245,377 | B1 * | 1/2016 | Jarosz | G06T 15/06 |
| 9,280,484 | B2 * | 3/2016 | Nayak | G06F 12/0891 |
| 9,355,492 | B2 * | 5/2016 | Droske | G06T 15/06 |

OTHER PUBLICATIONS

Clarberg, P., et al., Practical product importance sampling for direct illumination, Computer Graphics Forum (Proc. of Eurographics), Apr. 2008, pp. 681-690, vol. 27—issue 2.

(Continued)

*Primary Examiner* — Phu K Nguyen
(74) *Attorney, Agent, or Firm* — Sheppard, Mullin, Richter & Hampton LLP

(57) ABSTRACT

Methods and systems of joint path importance sampling are provided to construct light paths in participating media. The product of anisotropic phase functions and geometric terms across a sequence of path vertices are considered. A connection subpath is determined to join a light source subpath with a light receiver subpath with multiple intermediate vertices while considering the product of phase functions and geometry terms. A joint probability density function ("PDF") may be factorized unidirectional or bidirectional. The joint PDF may be factorized into a product of multiple conditional PDFs, each of which corresponds to a sampling routine. Analytic importance sampling may be performed for isotropic scattering, whereas tabulated importance sampling may be performed for anisotropic scattering.

21 Claims, 7 Drawing Sheets

(56) References Cited

OTHER PUBLICATIONS

Clarberg, P., et al., Wavelet importance sampling: efficiently evaluating products of complex functions, ACM Transactions on Graphics (TOG)—Proceedings of ACM SIGGRAPH 2005, Jul. 2005, pp. 1166-1175, vol. 24—issue 3, ACM, New York, NY, USA.

Cline, D., et al., Energy redistribution path tracing, ACM Transactions on Graphics (TOG)—Proceedings of ACM SIGGRAPH 2005, Jul. 2005, pp. 1186-1195, vol. 24—issue 3, ACM, New York, NY, USA.

D'Eon, E., et al., A quantized-diffusion model for rendering translucent materials, ACM Transactions on Graphics (TOG)—Proceedings of ACM SIGGRAPH 2011, Jul. 2011, article 56, vol. 30—issue 4, ACM, New York, NY, USA.

Jakob, W., et al., Manifold exploration: A Markov chain Monte Carlo technique for rendering scenes with difficult specular transport, ACM Transactions on Graphics (TOG)—Proceedings of ACM SIGGRAPH 2012, Jul. 2012, article 58, vol. 31—issue 4, ACM, New York, NY, USA.

Jarosz, W., et al., The beam radiance estimate for volumetric photon mapping, Computer Graphics Forum (Proceedings of Eurographics 2008), 2008, pp. 1-10, vol. 27—issue 2, Blackwell Publishing, Oxford, UK.

Jarosz, W., et al., Importance sampling spherical harmonics, Computer Graphics Forum (Proc.of Eurographics), Apr. 2009, pp. 577-586, vol. 28—issue 2, Blackwell Publishing, Oxford, UK.

Jarosz, W., et al., A comprehensive theory of volumetric radiance estimation using photon points and beams, ACM Transactions on Graphics, Jan. 2011, pp. 5:1-5:19, vol. 30—issue 1, ACM, New York, NY, USA.

Jensen, H. W., et al., Efficient simulation of light transport in scenes with participating media using photon maps, SIGGRAPH '98 Proceedings of the 25th annual conference on Computer graphics and interactive techniques, 1998, pp. 311-320, ACM, New York, NY, USA.

Jensen, H. W., et al., A practical model for subsurface light transport, SIGGRAPH '01 Proceedings of the 28th annual conference on Computer graphics and interactive techniques, 2001, pp. 511-518, ACM, New York, NY, USA.

Jensen, H. W., Global illumination using photon maps, slightly extended version of the paper in Rendering Techniques '96 (Proceedings of the Seventh Eurographics Workshop on Rendering), pp. 21-30, 1996, pp. 1-17.

Kajiya, J. T., The rendering equation, ACM SIGGRAPH Computer Graphics, Aug. 1986, pp. 143-150, vol. 20—Issue 4, ACM, Dallas, TX, USA.

Krivanek, et al., Optimizing realistic rendering with many-light methods, ACM SIGGRAPH 2012 Courses, SIGGRAPH '12, 2012, article 7, ACM, New York, NY, USA.

Kulla, C., et al., Importance sampling techniques for path tracing in participating media, Computer Graphics Forum (Proceedings of Eurographics Symposium on Rendering 2012), 2012, pp. 1-10, vol. 31—issue 4, Sony Pictures Imageworks Inc.

Novak, J., et al., Virtual ray lights for rendering scenes with participating media, ACM Transactions on Graphics (TOG)—Proceedings of ACM SIGGRAPH 2012, Jul. 2012, pp. 60:1-60:11, vol. 31—issue 4, ACM, New York, NY, USA.

Pauly, M., et al., Metropolis light transport for participating media, Proceedings of the Eurographics Workshop on Rendering Techniques 2000, 2000, pp. 11-22, Springer-Verlag, London, UK.

Pegoraro, V., et al., An analytical approach to single scattering for anisotropic media and light distributions, Proceedings of Graphics Interface 2009, 2009, pp. 71-77, Canadian Information Processing Society, Toronto, Ont., Canada.

Premoze, S., et al., Path integration for light transport in volumes, Proceedings of Eurographics Symposium on Rendering 2003, 2003, pp. 1-12, The Eurographics Association.

Premoze, S., et al., Practical rendering of multiple scattering effects in participating media, Proceedings of Eurographics Symposium on Rendering 2004, 2004, pp. 363-374, The Eurographics Association.

Raab, M., et al., Unbiased global illumination with participating media, Monte Carlo and Quasi-Monte Carlo Methods 2006, 2008, pp. 591-606, Springer, Berlin.

Stam, J., Multiple scattering as a diffusion process, Rendering Techniques '95 (Proceedings of Eurographics Workshop on Rendering), 1995, pp. 1-11, Springer, Vienna.

Sun, B., et al., A practical analytic single scattering model for real time rendering, ACM Transactions on Graphics (TOG)—Proceedings of ACM SIGGRAPH 2005, Jul. 2005, pp. 1040-1049, vol. 24—issue 3, ACM, New York, NY, USA.

Sun, X., et al., Line space gathering for single scattering in large scenes, ACM Transactions on Graphics (TOG)—Proceedings of ACM SIGGRAPH 2010, 2010, pp. 54:1-54:8, vol. 29—issue 4, ACM New York, NY, USA.

Tessendorf, J., Radiative transfer as a sum over paths, Physical Review A, Jan. 15, 1987, pp. 872-878, vol. 35—issue 2, The American Physical Society.

Tsai, Y.-T., et al., Importance sampling of products from illumination and BDRF using spherical radial basis functions, The Visual Computer, May 29, 2008, pp. 817-826, vol. 24—issue 7, Springer-Verlag.

Veach, E., et al., Optimally combining sampling techniques for Monte Carlo rendering, SIGGRAPH '95 Proceedings of the 22nd annual conference on Computer graphics and interactive techniques, 1995, pp. 419-428, ACM, New York, NY, USA.

Veach, E., et al., Metropolis light transport, SIGGRAPH '97 Proceedings of the 24th annual conference on Computer graphics and interactive techniques, 1997, pp. 65-76, ACM Press/Addison-Wesley Publishing Co., New York, NY, USA.

Veach, E., Robust Monte Carlo methods for light transport simulation, PhD thesis, Dec. 1997, Stanford, CA, USA.

Walter, B., et al., Single scattering in refractive media with triangle mesh boundaries, ACM Transactions on Graphics (TOG)—Proceedings of ACM SIGGRAPH 2009, Aug. 2009, pp. 92:1-92:7, vol. 28—issue 3, ACM, New York, NY, USA.

\* cited by examiner

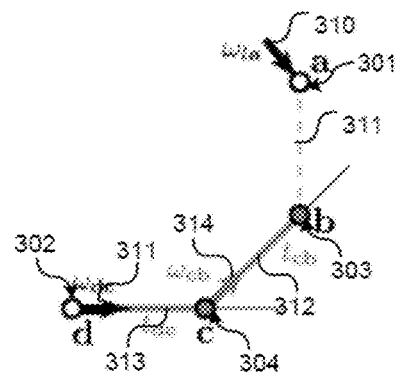
FIG. 3A
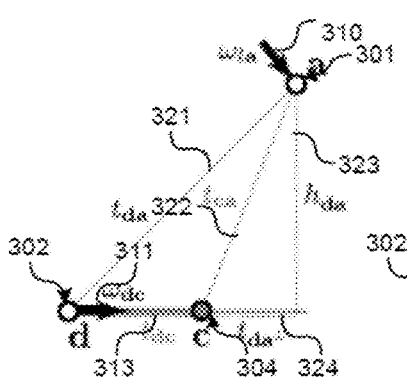 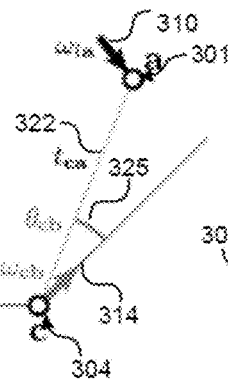 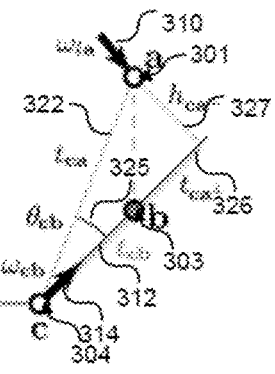
FIG. 3B  FIG. 3C  FIG. 3D

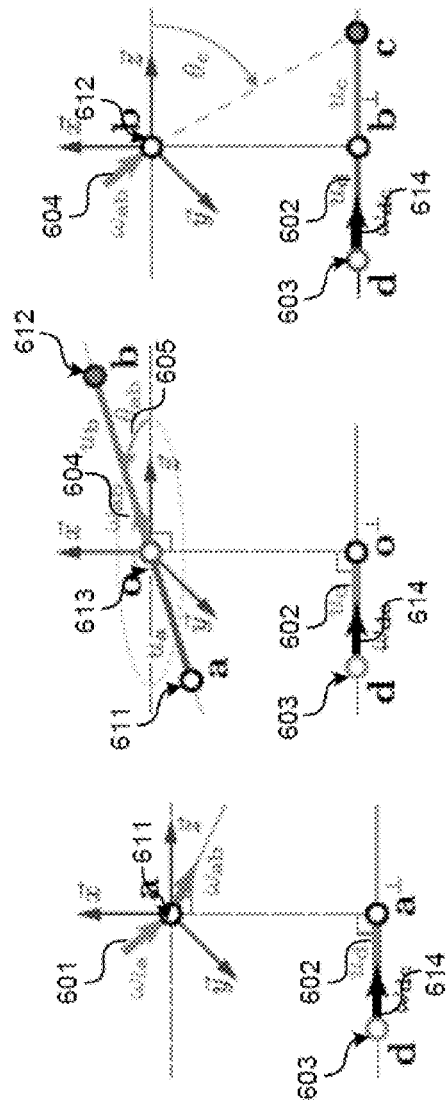

METHODS AND SYSTEMS OF JOINT PATH IMPORTANCE SAMPLING

CROSS-REFERENCE TO RELATED APPLICATIONS

This application claims the benefit of U.S. Provisional Application No. 61/861,636, filed on Aug. 2, 2013 and which is hereby incorporated herein by reference in its entirety.

TECHNICAL FIELD

The present application relates generally to computer graphics, more particularly, some embodiments relate to methods and systems of joint path importance sampling for rendering low-order anisotropic scattering.

DESCRIPTION OF THE RELATED ART

Simulating light transport in participating media has important applications across many diverse fields, such as medical imaging and nuclear physics, as well as computer graphics. However, faithful and accurate simulation of light transport can be challenging. Rendering is the process of generating an image from a model or a scene file. A scene file contains objects, comprising a virtual scene, in a strictly defined language or data structure, such as geometry, viewpoint, texture, lighting, and shading information. Data included in the scene file may be forwarded to a rendering program for processing and subsequently outputted to a digital image or raster graphics image file.

Tracing every particle of light in a scene is nearly impractical and would consume a huge amount of time. Even tracing a portion large enough to produce an image takes an inordinate amount of time if the sampling is not intelligently restricted. Methods for rendering participating media such as general Monte Carlo integration, the diffusion approximation, and the Feynman path integral approximation have emerged. However, each of the methods may be well suited for specific scattering scenarios, and a common limitation of all these methods is their inefficiency or inaccuracy in handling participating media with highly anisotropic scattering and moderate albedo.

BRIEF SUMMARY OF THE APPLICATION

Methods and systems of joint path importance sampling are provided to construct paths in participating media. The product of anisotropic phase functions and geometric terms across a sequence of path vertices are accounted for. Connection paths are introduced to join a light source (e.g., a light) subpath and a light receiver (e.g., a camera) subpath with multiple (e.g., two) additional intermediate vertices while accounting for the product of phase functions and geometry terms. In various embodiments, the probability density function ("PDF") is simplified by considering the extra dimension as a degree of freedom along with symmetries uniquely present in media light transport.

Various embodiments create a subpath comprising a set of subpath segments to connect the light source subpath and a light receiver subpath by providing a set of intermediate vertices. The vertices may be determined by joint importance sampling thereby determining a set of connection subpath segments. In various embodiments, the set of vertices may be determined based on a configuration that is received. In one embodiment, the configuration received comprises a first endpoint as well as a first direction, and a second endpoint as well as a second direction. The first direction may be defined by the light source and the first vertex, whereas the second direction may be defined by the light receiver and the second vertex. The light source subpath defined by the light source and the first endpoint, and the light receiver subpath defined by the light receiver and the second endpoint, may have arbitrary lengths.

A joint probability density function ("PDF") may be factorized differently. In some embodiments, factorization of a joint PDF is unidirectional. In other embodiments, factorization of a joint PDF is bidirectional. The set of connection vertices may be sampled from a joint distribution proportional to the geometry and scattering terms of the resulting connection subpath. In various embodiments, the joint PDF may be factorized into a product of multiple conditional PDFs, each of which corresponds to a sampling routine. Some embodiments perform analytic importance samplings for isotropic scattering. Exact importance sampling of the product of geometry terms for a sequence of vertices joining the given subpaths in the configuration is provided. Other embodiments perform tabulated importance sampling for anisotropic scattering. Tabulations for importance sampling the product of geometry and anisotropic phase function terms across a sequence of vertices joining the given subpaths in the configuration are provided.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

FIG. 3A illustrates an exemplary process of unidirectional factorization of the joint PDF.

FIG. 3B illustrates that an exemplary geometric configuration for sampling a distance for unidirectional factorization of the joint PDF for sampling the distance $t_{dc}$ 313.

FIG. 3C illustrates that an exemplary geometric configuration for sampling a direction for unidirectional factorization of the joint PDF for sampling the direction $\omega_{cb}$ 314.

FIG. 3D illustrates that an exemplary geometric configuration for sampling a distance for unidirectional factorization of the joint PDF for sampling the distance $t_{cb}$ 312.

FIG. 6A illustrates a canonical coordinate system for tabulating a conditional PDF in bidirectional factorization of the joint PDF for a spherical tabulation.

FIG. 6B illustrates a canonical coordinate system for tabulating a conditional PDF in bidirectional factorization of the joint PDF for a line tabulation for double scattering.

FIG. 6C illustrates a canonical coordinate system for tabulating a conditional PDF in bidirectional factorization of the joint PDF for a line tabulation for single scattering.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Central to Monte Carlo-based rendering algorithms is the task of sampling light transport paths connecting light sources to a light receiver, e.g., a camera. A path integral formulation of light transport for surfaces is introduced and extended to participating media. The path integrand can be factorized into the product of several terms, such as the geometry, transmittance, and scattering terms. Ideally, Monte Carlo integration would sample paths from a probability density function (PDF) proportional to the product of all terms in the integrand. However, in practice, subpaths are constructed incrementally, vertex-by-vertex, followed by a (deterministic) subpath connection, which may yield path PDFs that cannot account for some high-variance terms.

Path-sampling approaches traditionally construct light transport paths incrementally by sequentially sampling local scattering events. Unfortunately, this incremental construction sacrifices a global view of the path's contribution, and can lead to significant variance. Path-sampling methods for surface illumination have traditionally been extended to participating media by simply incorporating propagation distance as an independent sampling dimension. This increases dimensionality even further, and normally results in a more complicated formulation.

Figure 1:
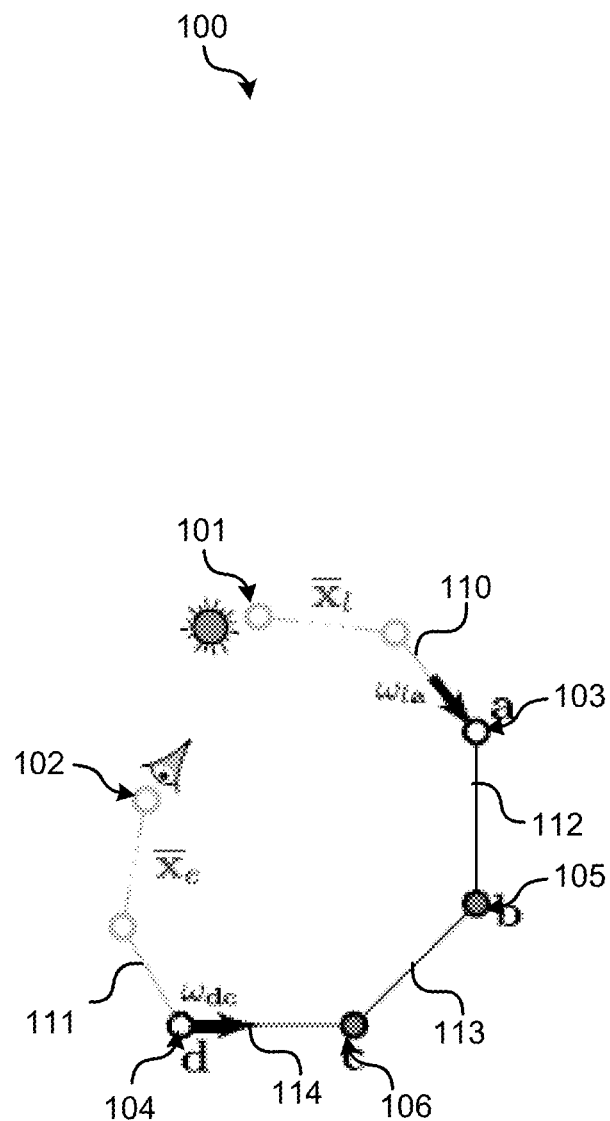
FIG. 1 illustrates an exemplary configuration for joint path importance sampling.

FIG. 1 illustrates an exemplary configuration for joint path importance sampling. In the illustrated configuration, a light source 101 and a light receiver (e.g., a camera, or an observer, etc.) are provided, and the light subpath $\bar{x}_l a$ 110 and an eye subpath $d\bar{x}_e$ 111 are given. The full path $\bar{x}_l abcd \bar{x}_e$ is constructed to connect the endpoints a 103 and d 104 via a random-decision intermediate connection subpath comprising a set of connection subpath segments. The set of connection subpath segments may be determined by a set of vertices. For example, the vertices b 105 and c 106 determine a set of connection subpath segments ab 112, bc 113, and cd 114. In various embodiments, given the vertices a 103 and d 104, respectively with an incident and an outgoing direction, the vertices b 105 and c 106 are sampled from a joint distribution proportional to the geometry and scattering terms of the resulting connection subpath segments 112-114. The subpaths $\bar{x}_l$ 110 and $\bar{x}_e$ 111 may have arbitrary lengths.

For example, when $\bar{x}_l$ 110 has a length of zero, the endpoint a is on the light source 101. When $\bar{x}_e$ 111 has a zero length, the endpoint d is on the camera lens. In various embodiments, a direction $\omega_{dc}$ at vertex d 104 is given, which may be sampled as part of the eye subpath. In various embodiments, the inputs to the joint path importance sampling may include the vertex a 103 with its incident direction $\omega_{la}$ and the vertex d 104 with an outgoing direction $\omega_{dc}$. In one embodiment, the new vertex c 106 must reside on the ray (d, $\omega_{dc}$), and the distance $t_{dc}$ from the vertex d 104 along $\omega_{dc}$ and another vertex b 105 need to be sampled. The probability density function (PDF) of the entire path $\bar{x}_l abcd \bar{x}_e$ is provided in Equation (1):

$$p(\bar{x}) = p(\bar{x}_l, a, \omega_{dc}, d, \bar{x}_e) p(b, t_{dc} | \omega_{la}, a, \omega_{dc}, d) G(c, d), \quad (1)$$

where the geometry term G(c, d) converts the PDF to the volume measure. In various embodiments, the PDF $p(\bar{x}_l, a, \omega_{dc}, d, \bar{x}_e)$ may be provided by a rendering algorithm.

Figure 2:
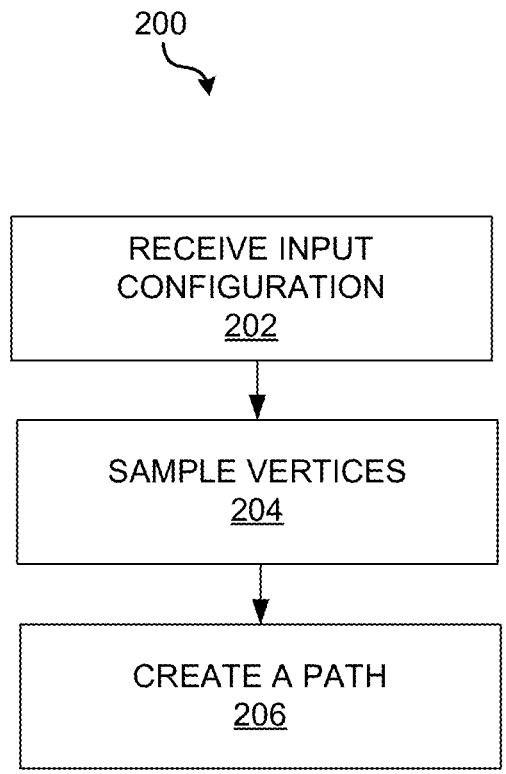
FIG. 2 is a flow diagram illustrating an exemplary method 100 of joint path importance sampling.

FIG. 2 is a flow diagram illustrating an exemplary method 100 of joint path importance sampling. At step 202, an input configuration is received. The input configuration ($\omega_{la}, a, \omega_{dc}, d$) provides information regarding the endpoints a 103 and d 104. For example, a first direction $\omega_{la}$ is the direction of the first path defined by a first endpoint a and the light source, and a second direction $\omega_{dc}$ is the direction of the second path defined by a second endpoint d and the light receiver. All the PDFs including the directional PDFs and distance PDFs during the joint path importance sampling may be conditioned on the input configuration. In various embodiments, the input configuration may be represented as $\Xi = \omega_{la}, a, \omega_{dc}, d$. In various embodiments, a first subpath and a second subpath are provided. The first subpath may be a light source subpath, defined by the light source, potentially several intermediate points, and the first endpoint. The second subpath may be a light receiver subpath, defined by the light receiver, potentially several intermediate points, and the second endpoint. For example, referring back to FIG. 1, the first subpath is the light subpath $\bar{x}_l a$ and the second subpath is the eye subpath $d\bar{x}_e$.

Subsequently, at step 204, a set of vertices are sampled. A connection subpath comprising a set of subpath segments may be determined based on the set of vertices. The connection subpath connects the first endpoint and the second endpoint. As such, the connection subpath together with the first and the second subpaths may construct the full path connecting the light source with the light receiver. In various embodiments, only the product of the geometry terms and the phase functions is sampled, such that $$p(b, t_{dc} | \Xi) G(c, d) = C_\Xi G(abcd) \rho(abc), \quad (2)$$

where $C_\Xi$ is a normalization factor dependent on the input configuration $\Xi$. In one embodiment, two vertices b and c are sampled, and three subpath segments (e.g., subpath segments ab, bc, and cd) defined by the vertices a-d may be determined. At step 206, the full path is created. In various embodiments, the first subpath and the second subpath are connected by the set of subpath segments determined at step 204. In various embodiments, the direction $\omega_{dc}$ and the direction incident to the vertex d are given.

In various embodiments, at step 204, when sampling vertices, the joint PDF may be factorized. Factorization of the joint PDF may influence the definition of the individual sampling PDFs and the corresponding sampling routines. FIG. 3A illustrates an exemplary process of unidirectional factorization of the joint PDF. In one embodiment, factorization is unidirectional where the vertices are sampled from the same direction along the path starting from the first or the second vertex. In the illustrated example, the vertices a 310 and d 311 as well as the direction $\omega_{la}$ 310 and $\omega_{dc}$ 311 are given. The vertices b 303 and c 304, the distance of the subpath ab 311 and the direction $\omega_{cb}$ 314 are sampled. To sample the vertices b 303 and c 304, a distance $t_{dc}$ 313 is sampled, which effectively samples the vertex c 304 in combination with the direction $\omega_{dc}$ 311. Subsequently, a direction $\omega_{cb}$ 314 is sampled and a distance $t_{cb}$ 312 is subsequently sampled to obtain the vertex b 303. The joint PDF may be measured as:

$$p(b,t_{dc}|\Xi) = p(t_{cb},\omega_{cb},t_{dc}|\Xi)G(b,c), \quad (3)$$

because the vertex b 303 is sampled as a distance and direction from the vertex c 304. The joint PDF may be factorized into a product of three conditional PDFs, corresponding to sampling $t_{dc}$ 313 first, $\omega_{cb}$ 314 thereafter, and $t_{cb}$ 312 finally:

$$p(t_{dc},\omega_{cb},t_{cb}|\Xi) = p(t_{dc}|\Xi) \quad (4)$$

$$p(\omega_{cb}|t_{dc},\Xi) \quad (5)$$

$$p(t_{cb}|\omega_{cb},t_{dc},\Xi) \quad (6)$$

FIGS. 3B-3D illustrate geometric configurations for unidirectional factorization of the joint PDF. As illustrated in FIGS. 3B-3C, the vertex c 304 is obtained by sampling a distance $t_{dc}$ 313 along the direction $\omega_{dc}$ 311. Subsequently, a direction $\omega_{cb}$ 314 is sampled from the vertex c 304. Finally, the vertex b 303 is obtained by sampling a distance $t_{cb}$ 312 along the direction $\omega_{cb}$ 314. FIG. 3B illustrates that an exemplary geometric configuration for sampling the distance $t_{dc}$ 313. FIG. 3C illustrates a geometric configuration for sampling the direction $\omega_{cb}$ 314. FIG. 3D illustrates a geometric configuration for sampling the distance $t_{cb}$ 312. In various embodiments, the phase function is constant for the case of isotropic scattering, Equation (3) may be simplified to Equation (7):

$$p(t_{cb},\omega_{cb},t_{dc}|\Xi) = C_\Xi G(a,b). \quad (7)$$

The PDF $p(t_{cb}|\omega_{cb},t_{dc},\Xi)$ may be defined as the ratio of the joint distribution and the marginalized joint according to Equation (8):

$$p(t_{cb}|\omega_{cb},t_{dc},\Xi) = \frac{p(t_{cb},\omega_{cb},t_{dc}|\Xi)}{p(\omega_{cb},t_{dc}|\Xi)}. \quad (8)$$

The denominator of Equation (8) may be obtained by integrating out the distance $t_{cb}$ 312 according to Equation (9):

$$p(\omega_{cb},t_{dc}|\Xi) = \int_0^\infty p(t_{cb},\omega_{cb},t_{dc}|\Xi) = \quad (9)$$

$$dt_{cb} = C_\Xi \int_0^\infty \frac{1}{h_{ca\perp}^2 + (t_{ca\perp} - t_{cb})^2} dt_{cb} = C_\Xi \frac{\pi - \theta_{cb}}{t_{ca}\sin\theta_{cb}},$$

where $h_{ca\perp}$ 327 is the distance between the vertex a 301 and the ray (c, $\omega_{cb}$), $t_{ca\perp}$ 326 is the distance between the vertex c 304 and this projection, and $\theta_{cb}$ 325 is the angle between $\omega_{cb}$ 314 and the line between the vertices c 304 and a 301 of length $t_{ca}$ 322, as illustrated in FIG. 3D. The PDF of $t_{cb}$ 312 is defined according to Equation (10):

$$p(t_{cb}|\omega_{cb},t_{dc},\Xi) = \frac{t_{ca}\sin\theta_{cb}}{\pi - \theta_{cb}} \frac{1}{h_{ca\perp}^2 + (t_{ca\perp} - t_{cb})^2}. \quad (10)$$

The PDF $p(\omega_{cb}|t_{dc},\Xi)$ may be derived according to Equation (11):

$$p(\omega_{cb}|t_{dc},\Xi) = \frac{p(\omega_{cb},t_{dc}|\Xi)}{p(t_{dc}|\Xi)}. \quad (11)$$

The denominator of Equation (11) may be obtained by integrating out $\omega_{cb}$ 314 according to Equation (12):

$$p(t_{dc}|\Xi) = \quad (12)$$

$$\int_{S^2} p(\omega_{cb},t_{dc}|\Xi)d\omega_{cb} = \int_0^{2\pi}\int_0^\pi C_\Xi \frac{\pi - \theta_{cb}}{t_{ca}\sin\theta_{cb}}\sin\theta_{cb}d\theta d\phi = \frac{C_\Xi \pi^3}{t_{ca}}.$$

Hence, the PDF of the direction $\omega_{cb}$ 314 is derived as Equation (13):

$$p(\omega_{cb}|t_{dc},\Xi) = \frac{\pi - \theta_{cb}}{\pi^3 \sin\theta_{cb}}. \quad (13)$$

As illustrated in FIG. 3B, the final step in the marginalization procedure provides the PDF for sampling a distance $t_{dc}$ 313 along the ray (d, $\omega_{dc}$). In various embodiments, the normalization factor C, is derived. The PDF of Equation (12) is enforced to integrate to 1 according to Equation (14):

$$\int_0^\infty p(t_{dc}|\Xi)dt_{dc} = \int_0^\infty \frac{C_\Xi \pi^3}{\sqrt{h_{da\perp}^2 + (t_{da\perp} - t_{dc})^2}} dt_{dc} = 1, \quad (14)$$

where $h_{ca\perp}$ 327 is the distance between the vertex a 301 and the ray (c, $\omega_{dc}$), and $t_{ca\perp}$ 326 is the distance between vertex c 304 and this projection. By setting a maximum sampling distance $t_{dc}^{max}$ 313 along the direction $\omega_{dc}$ 311, the normalization factor $C_\Xi$ may be represented according to Equation (15):

$$C_\Xi \pi^3 = \frac{1}{C_{t_{dc}}^{max}} = \frac{1}{a\sinh\left(\frac{t_{dc}^{max} - t_{da\perp}}{h_{da\perp}}\right) - a\sinh\left(\frac{-t_{da\perp}}{h_{da\perp}}\right)}. \quad (15)$$

The conditional PDF for the distance $t_{dc}$ 313 is defined as:

$$p(t_{dc}|\Xi) = \frac{1}{C_{t_{dc}}^{max}} \frac{1}{\sqrt{h_{da\perp}^2 + (t_{da\perp} - t_{dc})^2}}. \quad (16)$$

The joint unidirectional PDF $p(b,t_{dc}|\Xi)$ may be obtained by multiplying the conditional PDFs from Equations (10), (13), and (16):

$$p(b, t_{dc} | \Xi) = p(t_{cb}, \omega_{cb}, t_{dc} | \Xi) G(b, c) = \frac{G(a, b) G(b, c)}{\pi^3 C_{dc}^{max}}. \quad (17)$$

In various embodiments, the corresponding sampling routines derived using the inverse cumulative distribution functions (CDFs) of the conditional PDFs (10), (13), and (16) may be needed in order to use in the context of importance sampling for rendering. A random distance $t_{dc}$ along $\omega_{dc}$ may be sampled using the inverse CDF of Equation (16):

$$t_{dc} = t_{da} \sinh(\xi C_{dc}^{max}) - t_{da\perp} (1 + \cosh(\xi C_{dc}^{max})), \quad (18)$$

where $t_{da} = \sqrt{h_{da\perp}^2 + t_{da\perp}^2}$ is the distance between vertices d 302 and a 301, and $\xi \in [0,1)$ is a uniform random number.

The corresponding CDF for the PDF for the direction $\omega_{cb}$ in Equation (13) is:

$$P(\omega_{cb}) = \int_0^{2\pi} \int_0^{\theta_{cb}} \frac{\pi - \theta}{\pi^3 \sin \theta} \sin \theta d\theta d\phi = \frac{(2\pi - \theta cb) \theta_{cb}}{\pi^2}. \quad (19)$$

Equation (19) may be inverted to determine the angle $\theta_{cb}$:

$$\theta_{cb} = \pi(1 - \sqrt{\xi_1}), \text{ and } \phi_{cb} = 2\pi \xi_2, \quad (20)$$

where $\xi_1$ and $\xi_2$ are uniform random numbers. In some embodiments, subsequent to being sampled in a local frame where the direction from the vertex c 304 to the vertex a 301 is the z-axis, the direction $\omega_{cb}$ 314 may be transformed into world coordinates.

Given a uniform random number $\xi$, a distance $t_{cb}$ 312 along $\omega_{cb}$ 314 may be sampled using the inverse CDF of the equiangular PDF (10), and the vertex b 303 may be obtained according to Equation (21):

$$t_{cb} = t_{ca\perp} + h_{ca\perp} \tan\left(\xi(\pi - \theta_{cb}) + \theta_{cb} - \frac{\pi}{2}\right). \quad (21)$$

Figure 4:
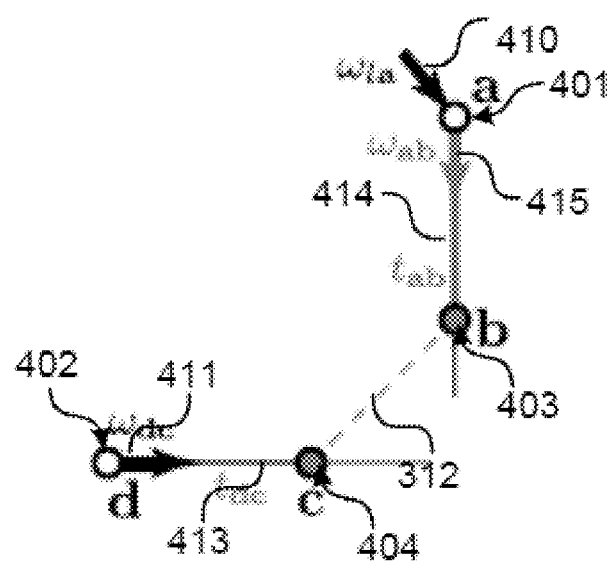
FIG. 4 illustrates an exemplary process of bidirectional factorization of the joint PDF.

FIG. 4 illustrates an exemplary process of bidirectional factorization of the joint PDF. In one embodiment, factorization is bidirectional where the vertices are sampled from the opposite directions. To sample the vertices b 403 and c 404, a direction $\omega_{ab}$ 415 from the vertex a 401 may be first sampled, a distance $t_{ab}$ 414 may be subsequently sampled to obtain the vertex b 403, and finally a distance $t_{dc}$ 413 is sampled from the vertex d 402 along the direction $\omega_{dc}$ 411 to obtain the vertex c 404. Because the vertex b 403 is sampled as a distance and direction from the vertex a 401, the joint PDF may be measured according to Equation (22):

$$p(b, t_{dc} | \Xi) = p(t_{ab}, \omega_{ab}, t_{dc} | \Xi) G(a, b). \quad (22)$$

The joint PDF may be factorized into a product of three conditional PDFs, corresponding to sampling $\omega_{ab}$ 415 first, $t_{ab}$ 414 thereafter, and $t_{dc}$ 413 finally as such:

$$p(\omega_{ab}, t_{ab}, t_{dc} | \Xi) = p(\omega_{ab} | \Xi) \quad (23)$$

$$p(t_{ab} | \omega_{ab}, \Xi) \quad (24)$$

$$p(t_{dc} | \omega_{ab}, t_{ab}, \Xi) \quad (25)$$

In various embodiments, to handle anisotropic scattering, a table may be constructed to store tabulated PDFs for a discrete set of positions and directions. In one embodiment, a table may tabulate PDFs of Equation (3) using both the unidirectional and the bidirectional factorizations. A circularly symmetric 1-dimensional (1D) phase function, that depends only on the deflection angle between the incident and outgoing directions, may be assumed. In one embodiment where isotropic scattering is processed, the phase function is $\rho = \frac{1}{4\pi}$. For a medium with a given phase function, an entire family of PDFs exist and may be determined for the geometric configuration of each sampling event. For example, given a line $(c, \omega_{cb})$ there is in general a different 1D PDF along that line for every possible relative location of the vertex a and incident direction $\omega_{la}$. Various embodiments may construct the table to hold tabulated line PDFs for a discrete set of positions a and directions $\omega_{la}$.

In some embodiments, a canonical coordinate system is designed to reduce the dimensionality of tables and the construction time. In some embodiments, the PDF domain may be warped via a suitable reparameterization that analytically eliminates tabulation variations.

In some embodiments where unidirectional factorization is performed, the factors given in Equations (4)-(6) are tabulated for the joint PDF such that the phase functions are taken into account according to Equation (26):

$$p(t_{cb}, \omega_{cb}, t_{dc} | \Xi) = C_\Xi G(a,b) \rho(a) \rho(b) \rho(c). \quad (26)$$

Figure 5C:
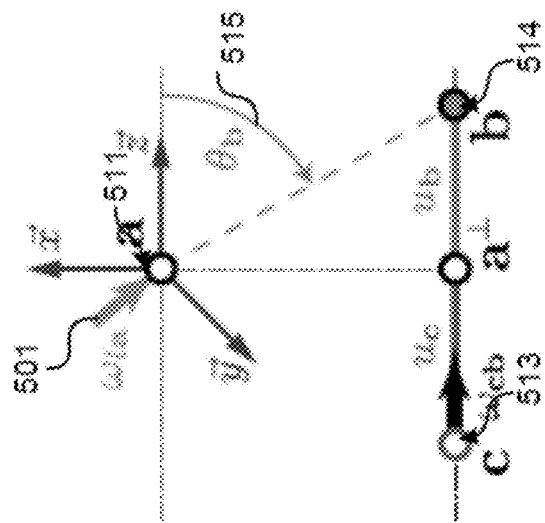
FIG. 5C illustrates a canonical coordinate system for tabulating a conditional PDF in unidirectional factorization of the joint PDF for a line tabulation for single scattering.
Figure 5B:
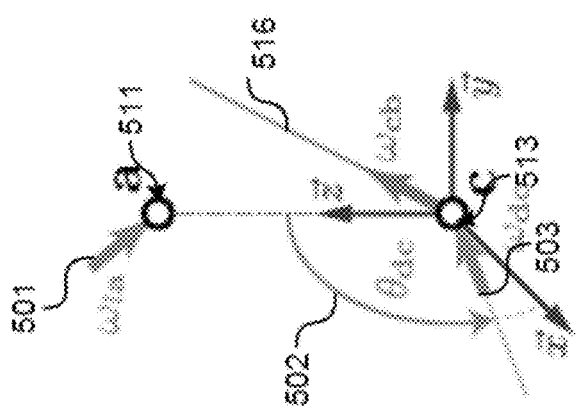
FIG. 5B illustrates a canonical coordinate system for tabulating a conditional PDF in unidirectional factorization of the joint PDF for a spherical tabulation.
Figure 5A:
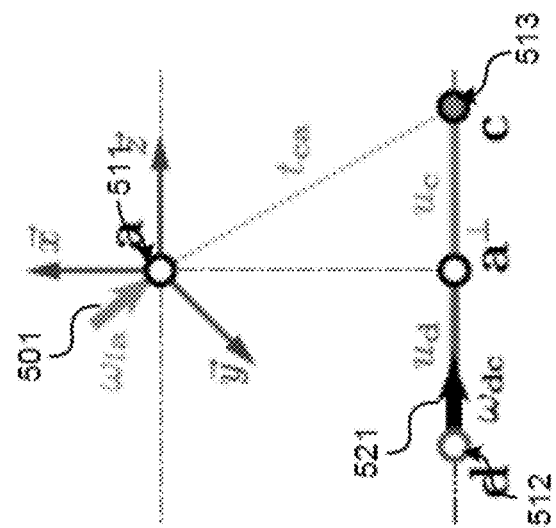
FIG. 5A illustrates a canonical coordinate system for tabulating a conditional PDF in unidirectional factorization of the joint PDF for a line tabulation for double scattering.

FIGS. 5A-5C illustrate canonical coordinate systems for tabulating the conditional PDFs in unidirectional factorization of the joint PDF, such as the unidirectional factorization (4)-(6) of the joint PDF (2) for the case of anisotropic scattering. In various embodiments, a table indexed by various table parameters (e.g., the directions $\omega_{la}$ 501 and $\omega_{dc}$ 503, and the angle $\theta_{dc}$ 502) may be constructed for each configuration received. Each table may store tabulated PDFs that are used for making the corresponding sampling decisions, such as those illustrated in FIGS. 3B-D. FIG. 5A illustrates a line tabulation for double scattering; FIG. 5B illustrates a spherical tabulation; and FIG. 5C illustrates a line tabulation for single scattering.

The PDF $p(t_{cb} | \omega_{cb}, t_{dc}, \Xi)$ is the anisotropic generalization of the PDF defined in Equation (8), as illustrated in FIG. 3D. FIG. 5C illustrates the canonical coordinate system used for tabulation of the PDF $p(t_{cb} | \omega_{cb}, t_{dc}, \Xi)$. The PDF $p(t_{cb} | \omega_{cb}, t_{dc}, \Xi)$ may be tabulated by precomputing accurate approximations of the PDFs once and storing them in a compact table. The table may be used to sample a distance along any given ray. This configuration may be parameterized by $(a, c, \omega_{la}, \omega_{cb})$, which may be expressed using two angles representing $\omega_{la}$ 501 in a canonical coordinate system. The entire family of PDFs may be precomputed into a compact 2D table of 1D PDFs. As illustrated in FIG. 5C, given a line $(c, \omega_{cb})$ and the vertex a 511, the distance between the line and the vertex is scaled to one. The origin is placed at the vertex a 511, the z-axis is aligned with the line $(c, \omega_{cb})$, and the x-axis lies in the same plane. The table may be indexed by the direction vector $\omega_{la}$ 501. Each entry in the table may be a PDF $p(u)$ over the signed distance u along the line, measured from the projection of the vertex a 511 onto the line. The infinite line may be mapped to a finite angular domain from the x-axis with $\theta = \text{arc cot} u$. Each entry in the table may be a piecewise-linear approximation of Equation (27):

$$p(\theta(u)) = p(u) \left| \frac{du}{d\theta} \right| = p(u) \frac{1}{G(a, b(u))} \propto \rho(a) \rho(b(u)). \quad (27)$$

The entire domain of $\theta \in [0;\pi]$, may be tabulated by employing adaptive refinement to improve accuracy. The tabulation is constant if the scattering is isotropic. When scattering at the vertex a 511 is isotropic, the entire 2D table reduces to a single 1D distribution.

For any given ray $(c, \omega_{cb})$, the vertex a 511, and the direction $\omega_{la}$ 501, subsequent to constructing the coordinate system, the table may be indexed with the canonical spherical coordinates of $\omega_{la}$ 501. An angle $\theta_b$ 515 may be drawn from the retrieved tabulated PDF and constrained to the interval $\theta_b \in [0; \text{arc cot } u_c]$, and transformed to a canonical distance $u_b = \cot \theta_b$ to obtain the desired scattering distance along the ray $t_{cb} = u_c + u_b$. The PDF may be transformed from the angular measure to the Euclidean length measure according to Equation (28):

$$p(u_b) = p(\theta_b) \left| \frac{d\theta_b}{du_b} \right| = p(\theta_b)[G(a,b)]h_{ca\perp}, \quad (28)$$

where $h_{ca\perp}$ is the distance between the vertex a 511 and line $(c, \omega_{cb})$.

The spherical distribution, $p(\omega_{cb}|t_{dc}, \Xi)$, is used to sample the scattering direction $\omega_{cb}$ 516 at the vertex c 513. The spherical distribution $p(\omega_{cb}|t_{dc}, \Xi)$ is the anisotropic variant of the PDF defined in Equation (11). The Equations (29)-(30) may be tabulated:

$$p(\omega_{cb}|t_{cb}, \Xi) \propto \int_0^\infty p(t_{dc}, \omega_{cb}, t_{cb}|\Xi) dt_{cb}, \quad (29)$$

$$\propto p(c) \underbrace{\int_0^\infty G(a,b)\rho(a)\rho(b) dt_{cb}}_{P(\omega_{cb})}, \quad (30)$$

where $\rho(c)$ is in front of the integral, as it does not depend on the distance $t_{cb}$. The integral $P(\omega_{cb})$ is the normalization of a PDF entry in the previous tabulation for $p(t_{cb}|\omega_{cb}, t_{dc}, \Xi)$, and can be looked up without being computed. The directional distribution is proportional to the product of $\rho(c) P(\omega_{cb})$.

FIG. 5B illustrates the canonical coordinate system used for the tabulation of the spherical distribution. The origin is at the vertex c 513, the z-axis is the direction from the vertex c 513 to the vertex a 511, the x-axis is coplanar with the z-axis and the direction $\omega_{dc}$ 503. The PDF family (30) may have three degrees of freedom: 1) the direction $\omega_{la}$ 501 and the angle $\theta_{dc}$ 502 of $\omega_{dc}$ 503 from the z-axis. In one embodiment, $\rho(c)$ and $P(\omega_{cb})$ are tabulated separately and sampled from their product. A 2D table of spherical PDFs for $P(\omega_{cb})$ may be constructed, indexed by the direction $\omega_{la}$ 501, where for every tabulated direction $\omega_{cb}$, $P(\omega_{cb})$ is evaluated by looking up the corresponding PDF normalization from the $p(t_{cb}|\omega_{cb}, t_{dc}, \Xi)$ table. The single-scattered incident radiance filed (omitting transmittance) from the vertex a 511 at the vertex c 513, for a number of lobe orientations at the vertex a 511. The PDFs in the table are stored as fitted mixtures of von Mises Fischer (vMF) distributions.

The domain may be warped according to $\omega_{u,v} = \omega(\pi(1-\sqrt{u}), 2\pi v)$, and the PDFs stored are:

$$p(\omega_{u,v}) = p(\omega) \left| \frac{d\omega}{d\omega_{u,v}} \right| = p(\omega) \sin \theta_{dc}. \quad (31)$$

Subsequently, $(u,v)$ is sampled with PDF $p(u,v)$, which yields $\omega_{cb} = \omega_{u,v}$, using the transformation. The PDF of the sampled direction is:

$$p(\omega_{cb}) = p(u, v) \left| \frac{dudv}{d\omega_{cb}} \right| = p(u, v) \left[ \frac{\pi - \theta_{cb}}{\pi^3 \sin \theta_{cb}} \right]. \quad (32)$$

In one embodiment, when scattering at the vertex a 511 is isotropic, e.g., a point light, the PDF family (30) has only one degree of freedom, which is the angle $\theta_{dc}$ 502. The entire family may be stored in a compact 1D table of 2D PDFs, for a set of angles $\theta_{dc}$, without the need for vMF fitting and product sampling.

The PDF $p(t_{dc}|\Xi)$ may be used to sample a distance along the ray $(d, \omega_{dc})$, and is the anisotropic variant of the PDF defined in Equations (12) and (16), and may be represented as Equation (33):

$$p(t_{dc}|\Xi) \propto \int_s^2 \int_0^\infty p(t_{dc}, \omega_{cb}, t_{cb}|\Xi) dt_{cb} \omega_{cb} \quad (33)$$

$$\propto \int_s^2 p(\omega_{cb}|t_{dc}, \Xi) d\omega_{cb}. \quad (34)$$

In various embodiments, the value of this PDF may be obtained by looking up in the corresponding PDF normalizations from the table for $\omega_{cb}$.

FIG. 5A illustrates the geometric configuration for this family of PDFs, is identical to the one for $t_{cb}$, and the same coordinate system illustrated in FIG. 5C may be used. Variations due to the geometry may be eliminated by reparameterizing the tabulation domain using a different transformation: $v = a \sin hu$. The stored PDFs are:

$$p(v(u)) = p(u) \left| \frac{du}{dv} \right| = p(u) \left[ \frac{1}{\sqrt{1+u^2}} \right] = p(u) t_a, \quad (35)$$

where $t_a$ is the distance between the corresponding point and the vertex a 501.

In various embodiments, sampling a distance $t_{dc} = -u_d + u_c$ along a ray $(d, \omega_{dc})$ proceeds analogously to $t_{cb}$. The canonical coordinate system may be constructed and the distribution corresponding to $\omega_{la}$ may be retrieved. $v_c$ may be sampled from the corresponding tabulated PDF and constrained to the interval $v_c \in [0; a \sin hu_d]$, and $u_c = \sin h v_c$ is computed. The PDF of the sampled distance is:

$$p(u_c) = p(v_c) \left| \frac{dv_c}{du_c} \right| = p(v_c) \left[ \frac{1}{t_{ca}} \right]. \quad (36)$$

In some embodiments where bidirectional factorization is performed, the factors given in Equations (23)-(25) are tabulated for the joint PDF where the phase functions are also taken into account:

$$p(\omega_{ab}, t_{ab}, t_{dc}|\Xi) = C_\Xi G(b,c)\rho(a)\rho(b)\rho(c) \quad (37)$$

FIGS. 6A-6C illustrate canonical coordinate systems for tabulating the conditional PDFs in a bidirectional factorization of the joint PDF, such as the bidirectional factorization (23)-(25) of the joint PDF (2) for the case of anisotropic scattering. In various embodiments, a table indexed by various table parameters (e.g., the directions $\omega_{la}$ 601 and $\omega_{ab}$ 604, the vertex d 603, the distance $u_d$ 602, and the angle $\theta_{dc}$ 605) may be constructed for each configuration. Each table may store tabulated PDFs that are used for sampling distances or directions. FIG. 6A illustrates a spherical tabulation; FIG. 6B illustrates a line tabulation for double scattering; and FIG. 6C illustrates a line tabulation for single scattering.

The PDF $p(t_{ab}|\omega_{ab},\Xi)$ may be used to sample a distance along a ray $(a,\omega_{ab})$, given another ray $(d,\omega_{dc})$. In various embodiments, the PDF $p(t_{ab}|\omega_{ab},\Xi)$ may be defined as:

$$p(t_{ab} | \omega_{ab}, \Xi) = \frac{p(\omega_{ab}, t_{ab}, \Xi)}{p(\omega_{ab}, \Xi)} \propto p(\omega_{ab}, t_{ab}, \Xi) = \int G(b,c)\rho(a)\rho(b)\rho(c)dt_{dc} \propto \int G(b,c)\rho(b)\rho(c)dt_{dc}. \tag{38}$$

Anisotropic scattering at the vertex b 612 is taken into account and the semi-infinite extent of line $(d,\omega_{dc})$ is considered.

FIG. 6B illustrates the corresponding geometric configuration for table construction of the PDF $p(t_{ab}|\omega_{ab},\Xi)$. The canonical coordinate system is constructed such that the x-axis is aligned with the shortest connecting line between $(a,\omega_{ab})$ and $(d,\omega_{dc})$ and the origin o 613 is set to the end of the connecting line on $(a,\omega_{ab})$. The z-axis may be aligned with the direction $\omega_{dc}$ 614. An entire family of these PDFs exist and may be parameterized by $(a,\omega_{ab})$ and $(d,\omega_{dc})$ half-lines. The symmetries in the geometry configuration and scale-invariance allow the family of PDFs to be parameterized by a few parameters including the angle $\theta_{ab}$ 605 between the direction $\omega_{ab}$ 604 and the direction $\omega_{dc}$ 614. The shape of the PDFs may depend on the actual location of the vertex d 603 along the $(d,\omega_{dc})$ line. The distance $u_d$ 602 from the projection of the origin onto $(d,\omega_{dc})$ may be an additional parameter to construct a 2D table of 1D PDFs. For every combination of the angle $\theta_{ab}$ 605 and the distance $u_d$ 602, the associated PDF assigns probability density to distance u from the origin on the infinite line $(a,\omega_{ab})$. The piecewise-linear approximation of this PDF may be constructed by looking up the integral (38), to which the constructed PDF is proportional, from the previously constructed table for the PDF $p(t_{dc}|\omega_{ab},t_{ab},\Xi)$.

The PDF p(u) in the canonical coordinate system may be defined over an entire infinite $(a,\omega_{ab})$ line. The PDF p(u) may be mapped to a finite domain by parameterize the position u using v=a sin hu to allow tabulation. The PDFs which is stored in the table are:

$$p(v(u)) = p(u)\left|\frac{du}{dv}\right| = p(u)\left[\frac{1}{\sqrt{1+u^2}}\right] = p(u)t_{o\perp}, \tag{39}$$

which may be constant for isotropic phase functions $\rho(c)$ and $\rho(b)$, and an infinite ray $(d,\omega_{dc})$, where $t_{o\perp}$ is the distance between the corresponding point and $o^\perp$. Any possible variation of the PDF may be solely due to the anisotropy of the phase function and the position of the vertex d 603 along the direction $\omega_{dc}$ 614.

Given two rays $(d,\omega_{dc})$ and $(a,\omega_{ab})$, the canonical coordinate system may be constructed and the distribution corresponding to the direction $\omega_{la}$ 601 may be retrieved for sampling. $v_b$ may be sampled from the corresponding tabulated PDF, constrained to the interval $v_b \in [0; a \sin h\, u_a]$, and $u_b$=sin h $v_b$ is computed. The PDF of the sampled distance $t_{ab}$=$u_a$+$u_b$ is:

$$p(u_b) = p(v_b)\left|\frac{dv_b}{du_b}\right|p(v_b)\left[\frac{1}{t_{bo\perp}}\right]. \tag{40}$$

The PDF $p(\omega_{ab}|\Xi)$ is used to sample a direction $\omega_{ab}$ at the vertex a 611, and may be defined as:

$$p(\omega_{ab} | \Xi) = \frac{p(\omega_{ab}, \Xi)}{p(\Xi)} \propto p(\omega_{ab}, \Xi) = \tag{41}$$

$$\int p(\omega_{ab}, t_{ab} | \Xi) dt_{ab} \propto p(a) \underbrace{\int G(b,c)\rho(b)\rho(c)dt_{ab}}_{P(\omega_{ab})},$$

where $\rho(a)$ is in front of the integral, as it does not depend on the distance $t_{ab}$. The integral $P(\omega_{ab})$ is the normalization of a corresponding PDF in the table constructed for the PDF $p(t_{ab}|\omega_{ab},\Xi)$, and can be readily looked up. The desired distribution is proportional to the product $\rho(a)P(\omega_{ab})$ FIG. 6C illustrates the canonical coordinate system used for the tabulation of $p(\omega_{ab}|\Xi)$. The origin is at the vertex a, the z-axis is aligned with the direction $\omega_{dc}$ 614, and the x-axis lies in the same plane. The PDF family (41) may be spanned by the direction $\omega_{la}$ 601 and the position of the vertex d 603 along the direction $\omega_{dc}$ 614, given by the distance $u_d$ 602, as illustrated. A 1D table of tabulated 2D PDFs may be constructed and indexed by the distance $u_d$ 602. The spherical distributions in the PDF family have a singularity around the z-axis, which is due to the $\sin^{-1}\theta$ factor in the analytic inverse CDF. This singularity may be eliminated by warping the spherical domain using the transformation. The PDFs that are stored are:

$$p(\omega_{u,v}) = p(\omega)\left|\frac{d\omega}{d\omega_{u,v}}\right| = p(\omega)\sin\theta_{ab}. \tag{42}$$

Subsequently, the given configuration may be transformed into the canonical coordinate system and a PDF may be retrieved from the table and indexed with the distance $u_d$ 602. (u,v) may be sampled with PDF p(u,v), which yields $\omega_{cb}=\omega_{u,v}$ using the transformation. The PDF of the sampled direction is:

$$p(\omega_{ab}) = p(u,v)\left|\frac{dudv}{d\omega_{ab}}\right| = p(u,v)\left[\frac{1}{2\pi^2 \sin\theta_{ab}}\right]. \tag{43}$$

Figure 7:
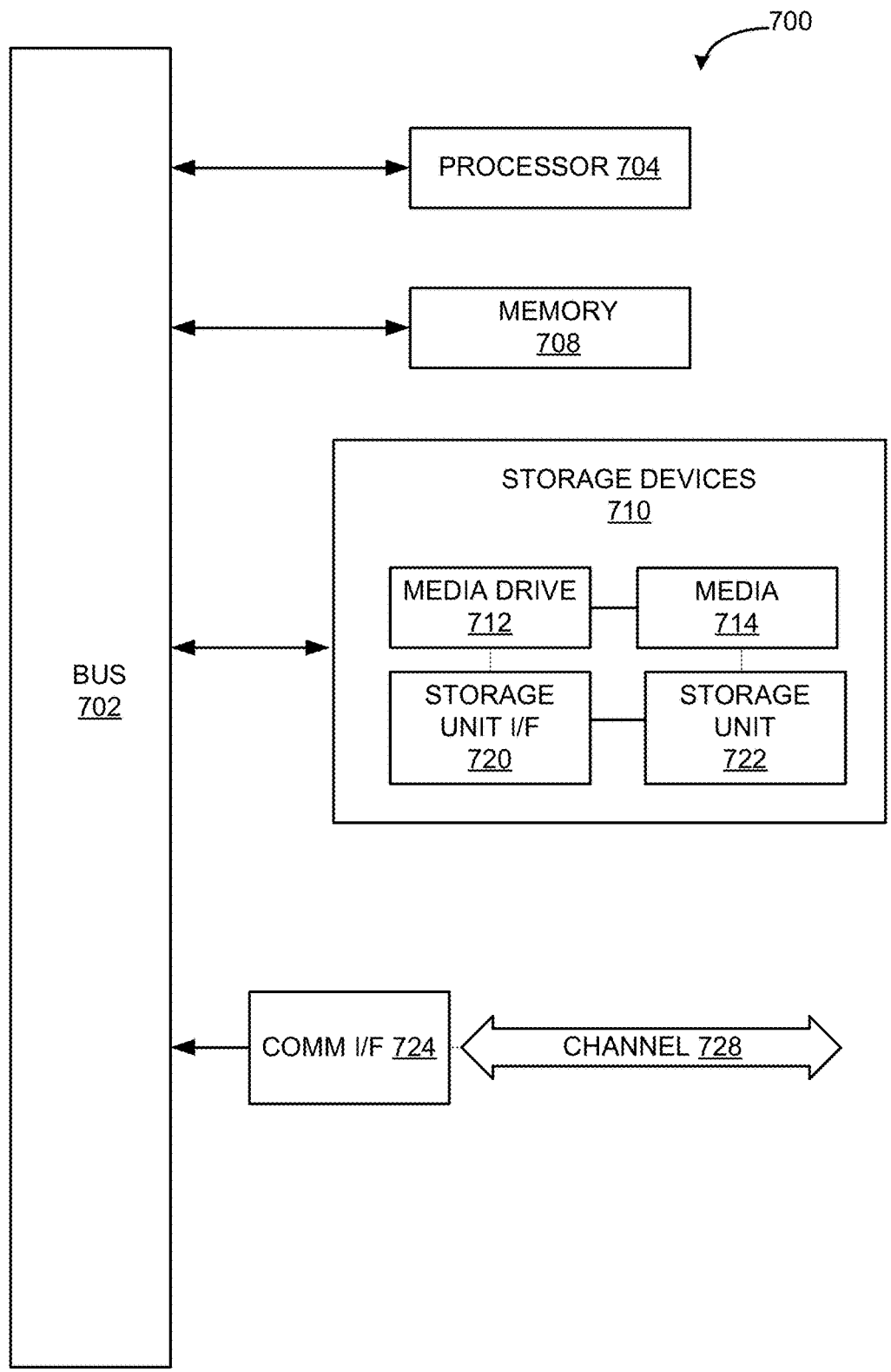
FIG. 7 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of sampling light paths connecting a light source subpath to a light receiver subpath, comprising:
   receiving an input configuration, the input configuration comprises a first endpoint, a first direction, a second endpoint, and a second direction;
   sampling a set of vertices to determine a set of subpath segments according to a sampling function defined as a product of a set of geometry terms and a set of phase functions;
   creating a subpath comprising the set of subpath segments to connect the light source subpath with the light receiver subpath;
   wherein the sampling function comprises a joint probability density function, and the step of sampling a set of vertices comprises factorizing the joint probability density function into a product of a set of conditional probability density functions; and
   each of the conditional probability density function corresponds to a distance sampling and a direction sampling.

2. The computer-implemented method of claim 1, wherein the step of sampling the set of vertices comprises deriving the set of conditional probability density functions and a set of sampling routines, each sampling routine of the set of sampling routines corresponding to a conditional probability density function of the set of conditional probability density functions.

3. The computer-implemented method of claim 2, wherein the step of sampling the set of vertices comprises:
   obtaining a first vertex by sampling a first distance along the second direction from the second endpoint; and
   obtaining a second vertex by sampling a third direction from the first vertex and sampling a second distance along the third direction.

4. The computer-implemented method of claim 2, wherein each of the set of conditional probability density functions is configured for isotropic scattering.

5. The computer-implemented method of claim 1, wherein the set of conditional probability density functions are obtained by performing a unidirectional factorization such that the set of vertices are sampled from the same direction along a path starting from a second vertex.

6. The computer-implemented method of claim 5, wherein each sampling routine is derived from using an inverse cumulative distribution function of the each conditional probability density function.

7. The computer-implemented method of claim 6, wherein the step of sampling the set of vertices comprises:
   obtaining a first vertex by sampling a third direction from the first endpoint and sampling a first distance along the third direction; and
   obtaining a second vertex by sampling a second distance along the second direction from the second endpoint.

8. The computer-implemented method of claim 6, wherein each of the set of conditional probability density functions is configured for anisotropic scattering.

9. The computer-implemented method of claim 8, wherein the step of sampling the set of vertices comprise constructing a set of tables comprising a set of tabulated line probability density functions for a set of positions and directions for each of the set of conditional probability density functions.

10. The computer-implemented method of claim 8, wherein the step of constructing the set of tables comprises:
    creating a first tabulation for a first PDF for by sampling a third direction from the first endpoint;

creating a second tabulation for a second PDF for a first distance along the third direction from the first endpoint to obtain a first vertex; and creating a third tabulation for a third PDF for sampling a second distance along the second direction from the second endpoint.

11. The computer-implemented method of claim 1, wherein the set of conditional probability density functions are obtained by performing a bidirectional factorization such that the set of vertices are sampled from opposite directions.

12. A system of sampling light paths connecting a light source subpath to a light receiver subpath, comprising:
non-transitory memory storing a set of instructions; and
a processor coupled to the non-transitory memory, wherein the set of instructions are configured to cause the processor to perform:
receiving an input configuration, the input configuration comprises a first endpoint, a first direction, a second endpoint, and a second direction;
sampling a set of vertices to determine a set of subpath segments according to a sampling function defined as a product of a set of geometry terms and a set of phase functions;
creating a subpath comprising the set of subpath segments to connect the light source subpath with the light receiver subpath;
wherein the sampling function comprises a joint probability density function, and the set of instructions are configured to cause the processor to factorize the joint probability density function into a product of a set of conditional probability density functions when performing the step of sampling a set of vertices.

13. The system of claim 12, wherein the set of conditional probability density functions are obtained by performing a unidirectional factorization such that the set of vertices are sampled from the same direction along a path starting from a second endpoint.

14. The system of claim 13, wherein each of the set of conditional probability density functions is configured for isotropic scattering.

15. The system of claim 14, wherein the each sampling routine is derived from using an inverse cumulative distribution function of the each conditional probability density function.

16. The system of claim 15, wherein the set of instructions are configured to cause the processor to:
obtain a first vertex by sampling a third direction from the first endpoint and sampling a first distance along the third direction; and
obtain a second vertex by sampling a second distance along the second direction from the second endpoint, when performing the step of sampling a set of vertices.

17. The system of claim 12, wherein the set of instructions are configured to cause the processor to perform:
obtaining a first vertex by sampling a first distance along the second direction from the second endpoint; and
obtaining a second vertex by sampling a third direction from the first vertex and sampling a second distance along the third direction, when performing the step of sampling a set of vertices.

18. The system of claim 12, wherein the set of conditional probability density functions are obtained by performing a bidirectional factorization such that the set of vertices are sampled from opposite directions.

19. The system of claim 18, wherein each of the set of conditional probability density functions is configured for anisotropic scattering.

20. The system of claim 19, wherein the set of instructions are configured to cause the processor to construct a set of tables comprising a set of tabulated line probability density functions for a set of positions and directions for each of the set of conditional probability density functions, when sampling the set of vertices.

21. The system of claim 19, wherein the set of instructions are configured to cause the processor to:
create a first tabulation for a first PDF for by sampling a third direction from the first endpoint;
create a second tabulation for a second PDF for a first distance along the third direction from the first endpoint to obtain a first vertex; and
create a third tabulation for a third PDF for sampling a second distance along the second direction from the second endpoint, when performing the step of constructing the set of tables.

* * * * *